United States Patent [19]

Gottier

[11] 4,170,982
[45] Oct. 16, 1979

[54] SOLAR ENERGY STORAGE AND DISTRIBUTING DEVICE

[75] Inventor: Paul Gottier, Rutland, Vt.

[73] Assignee: Joseph C. Soncarato, Shelton, Conn.; a part interest

[21] Appl. No.: 843,073

[22] Filed: Oct. 17, 1977

[51] Int. Cl.$^2$ ............................................. F24H 3/14
[52] U.S. Cl. ............................. 126/99 A; 126/110 B; 126/400; 110/304; 237/55; 126/427
[58] Field of Search ................. 126/400, 270, 110 R, 126/110 B, 99 A; 165/48; 110/302, 304, 308; 237/53, 55, 1 A; 236/91 A

[56] References Cited

U.S. PATENT DOCUMENTS

| | | | |
|---|---|---|---|
| 2,780,218 | 2/1957 | Allen | 126/110 B |
| 3,236,294 | 2/1966 | Thomason | 165/48 |
| 3,996,919 | 12/1976 | Hepp | 126/270 |
| 4,049,195 | 9/1977 | Rugenstein | 237/1 A |
| 4,051,999 | 10/1977 | Granger et al. | 126/400 |
| 4,078,541 | 3/1978 | Roycraft | 126/99 R |

Primary Examiner—John J. Camby
Assistant Examiner—Larry I. Schwartz
Attorney, Agent, or Firm—Clarence A. O'Brien; Harvey B. Jacobson

[57] ABSTRACT

An energy storage and distributing device having a heat storage chamber arranged for retaining heat which can be received from a solar collector arrangement or from a furnace or furnaces disposed within the chamber itself. Mounted on the chamber is a plenum arrangement disposed for directing warm fluid to a space to be heated, such as a room or rooms of a house, while a fluid distribution system is associated with the plenum and the chamber for alternately directing a fluid current directly into the plenum and directly into the chamber, and thereby supplying the plenum selectively with warm fluid from one of the chamber or from a source disposed outside the chamber. In this manner, solar energy, and the like, can be fed directly to the plenum, or stored in the chamber, or if solar energy is not available for whatever reason, and insufficient heat energy is present in stored form within the chamber, a furnace or furnaces can be employed to supply the requisite heat energy. By this arrangement, heating is provided for heating buildings of various kinds in the most efficient and economical manner, and when a plurality of furnaces are provided, with whatever fuel may be available. The chamber is advantageously provided with a heat storage medium including layers of rocks separated by layers of discrete articles preferably constructed from cast iron or other suitable heat storing material and being in the form of a multi-pointed star which permits fluid flow through the separating layers of discrete articles to enhance circulation of the fluid being heated through the heat storage chamber.

5 Claims, 5 Drawing Figures

SOLAR ENERGY STORAGE AND DISTRIBUTING DEVICE

BACKGROUND OF THE INVENTION

1. Field of the Invention

This invention relates generally to heating systems for residences and similar building structures, and particularly to an energy storage and distributing device which makes optimum use of solar and other available energy sources in an integrated system providing building heating in the most efficient and economical manner possible with regard to available energy sources.

2. Description of the Prior Art

It is generally known to collect solar energy and store same in the basement of a residence, and the like, for use as needed in heating the structure. Examples of such solar heating apparatuses can be found in U.S. Pat. Nos. 3,236,294 and 3,812,903, issued to H. E. Thomason, on Feb. 22, 1966, and May 28, 1974, respectively. A further example can be seen in U.S. Pat. No. 2,680,565, issued June 8, 1954, to G. A. G. Lof.

SUMMARY OF THE INVENTION

It is an object of the present invention to provide an energy storage and distributing device which permits the use of solar energy in conjunction with energy obtained by combustion of at least one kind of fuel in order to assure uniform heating of a structure being heated regardless of available solar energy.

It is another object of the present invention to provide an energy storage and distributing device having one or more furnaces disposed within a heat storage chamber thereof for permitting heat energy received from a solar collector to be supplemented by combustion of oil, coal, wood, and other conventional fuels.

Yet another object of the present invention is to provide an energy storage and distributing device having a fluid distribution arrangement associated therewith for alternately directing a fluid current directly into a plenum of the device or directly into a chamber thereof, and supplying the plenum selectively with warm fluid from one of chamber or from a source, such as a solar collector, disposed outside the chamber.

Still another object of the invention is to provide a heat storage chamber including a heat storage medium of improved construction and efficiency as compared to conventional mediums.

It is a still further object of the present invention to provide a furnace construction especially suited for use with an energy storage and distributing device according to the invention, and which permits hot air heating of approved efficiency.

These and other objects are achieved according to the present invention by providing an energy storage and distributing device including a heat storage chamber for retaining heat, and having disposed therein at least one furnace for selectively providing such heat. Mounted on the chamber is a plenum arranged for directing warm fluid to a space to be heated, while a fluid distribution arrangement associated with the plenum and the heat storage chamber alternatively directs a fluid current directly into the plenum or directly into the chamber, and supplies the plenum selectively with warm fluid from one of the chamber or from a source disposed outside of the chamber.

The distributing arrangement preferably includes a duct having a single inlet and a pair of outlets, with the inlet being connected to a source of fluid current, such as that generated by a solar collector, and one of the outlets being in communication with the plenum and the other of the outlets being in communication with the heat storage chamber. An opening is provided between the chamber and plenum for placing the chamber and plenum in selective communication with a damper arrangement mounted in the outlets of the duct and in the opening provided between the chamber and plenum for selectively directing the fluid current between the plenum and chamber, one or the other or one to the other. This damper arrangement advantageously includes a first damper arranged in the one of the outlets for selectively blocking and unblocking the associated outlet, and a second damper arranged in the other of the outlets for selectively blocking and unblocking that outlet. It is intended that one of the first and second dampers will at all times be in a duct outlet blocking position, while the other of the first and second dampers will be in a duct blocking or unblocking position as the specific circumstances dictate. A third damper is arranged in the opening provided between the plenum and heat storage chamber for selectively blocking and unblocking the opening.

Preferably, a pair of furnaces will be disposed in the heat storage chamber, with one of the furnaces being capable of burning fuel oil, gas, and the like, while the other of the furnaces includes a firebox capable of burning wood and/or coal, and the like. By this arrangement, any available fuel can be employed with the invention in order to supplement heat energy obtained from the sun. These furnaces are constructed as counter-flow heat exchangers having associated therewith a burner arranged for applying heat to the exchanger. By "burner" as used herein is meant to include not only liquid and gas burners capable of combusting fuel oil, natural gas, and the like, but also fireboxes capable of combusting solid fuels, such as wood and coal.

The heat exchanger according to the invention advantageously includes a shell extending through the chamber and partially forming a flow path for a fluid to be heated, with a tube being disposed within and extending through the shell and cooperating with the shell to form the aforementioned fluid flow path. The tube itself is arranged forming a passageway through the heat storage chamber for combustion gases from the burner, which gases act to heat the fluid passing through the annular space provided between the shell and tube. A blower mounted on the heat storage chamber is arranged in communication with the shell for forcing a fluid, such as ambient air, into the shell and over the tube. The shell is provided with at least one perforation arranged placing the flow path in communication with the interior of the heat storage chamber so as to permit the heated fluid to exit the heat exchanger and enter a heat storage area of the chamber.

The heat storage chamber advantageously includes a housing forming a cavity in which the heat exchanger is disposed together with a heat absorbing medium arranged within the cavity covering the heat exchanger and capable of storing a heated fluid medium, such as the aforementioned air. This heat absorbing medium preferably comprises a plurality of layers of rock separated from one another by a plurality of layers of discrete articles. Each of these discrete articles is preferably constructed from iron, and the like, in the shape of a three-dimensional star having a plurality of points of generally pyramidal configuration.

Another advantageous feature of the present invention is the use with a furnace including a counter-flow heat exchanger as described above in conjunction with a plurality of fluid suction registers arranged for demanding fluid from the heat exchanger in accordance with temperature requirements of a specific space to be heated which is associated with a specific register.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
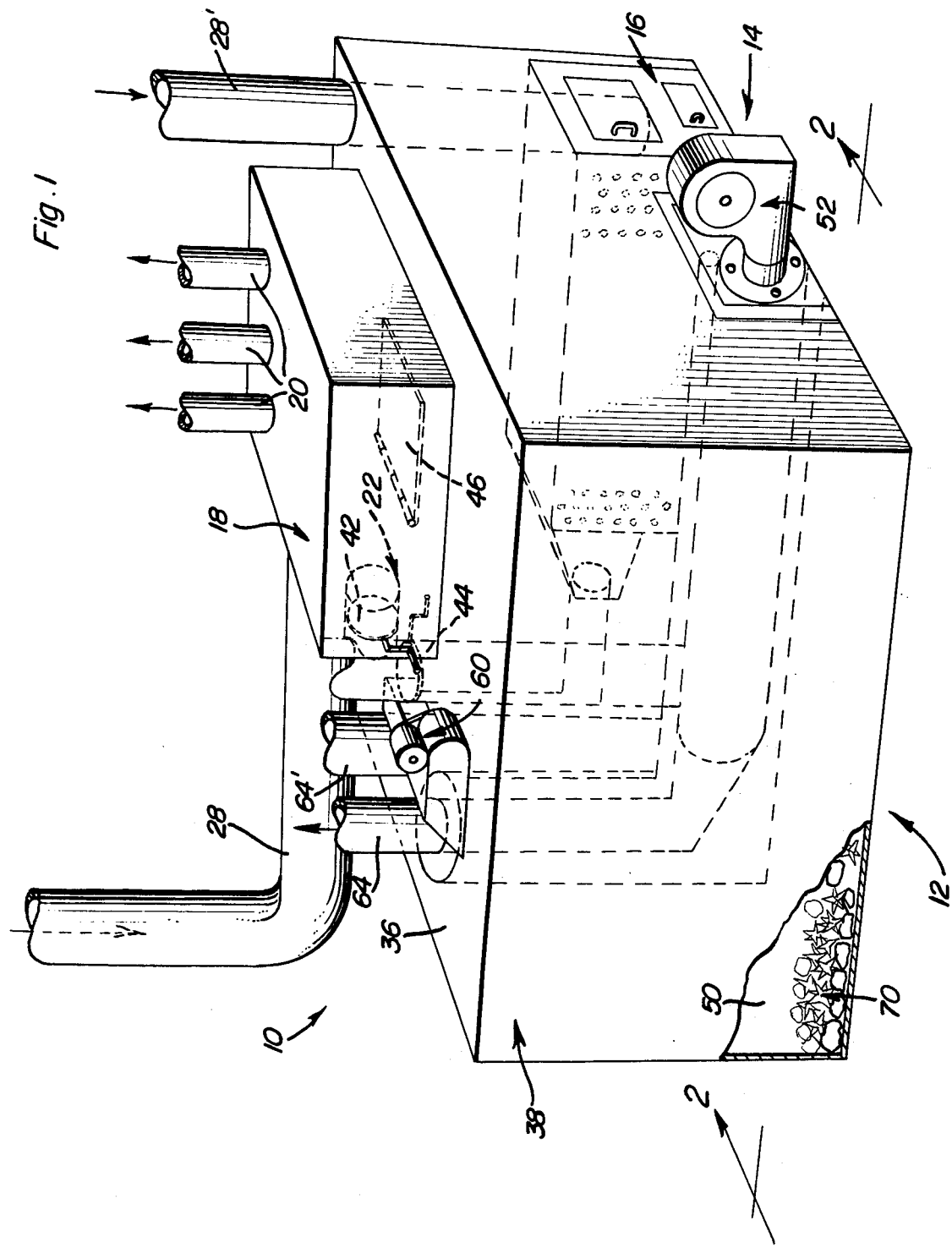
FIG. 1 is a schematic, fragmentary, perspective view, partly broken away and in section, showing an energy storage and distributing device according to the present invention.
Figure 2:
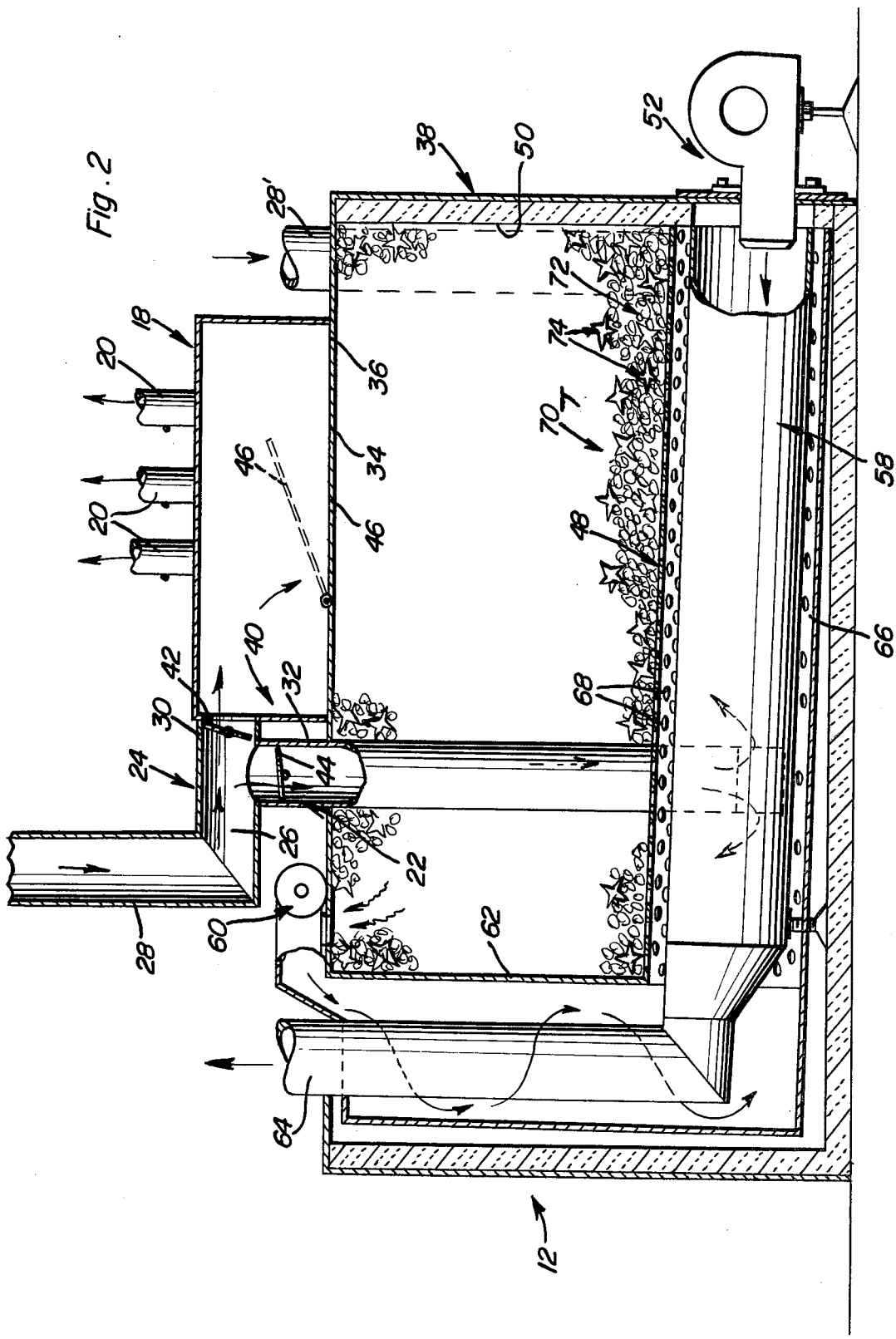
FIG. 2 is an enlarged, fragmentary, schematic, sectional view taken generally along the line 2—2 of FIG. 1.

Description of the Device Shown in Figs. 1 and 2

Referring now more particularly to FIGS. 1 and 2 of the drawings, an energy storage and distributing device 10 according to the present invention includes a heat storage chamber 12 arranged for retaining heat and having disposed therein a pair of furnaces 14 and 16. Mounted on chamber 12 is a plenum 18 disposed for directing warm fluid to a space (not shown) to be heated by means of a plurality of pipes, such as those designated 20. A fluid distribution arrangement 22 is associated with plenum 18 and chamber 12 for alternately directing a fluid current, such as air, directly into plenum 18 or directly into chamber 12, and supplying plenum 18 selectively with warm fluid from one of chamber 12 or from a source such as a conventional collector (not shown) disposed outside of chamber 12.

The fluid distribution arrangement 22 includes a duct 24 having a single inlet 26 connected to a conduit 28 which may lead to a solar collector (not shown) and the like. Duct 24 also has a pair of outlets 30 and 32 in communication with plenum 18 and chamber 12, respectively. A further conduit 28' can be arranged communicating with the interior of chamber 12 in order to permit air or other appropriate fluid to be returned to chamber 12 from a space or spaces being heated by device 10.

An opening 34 is provided in a top wall 36 of a housing 38 of chamber 12 for placing plenum 18 in communication with chamber 12 so as to permit heat to be transferred from the interior of chamber 12 into plenum 18.

A damper assembly 40 is mounted in the outlets 30 and 32 of duct 24 and in opening 34 for selectively directing fluid current between the various elements as conditions dictate. Assembly 40 includes a first damper 42 arranged in outlet 30 for selectively blocking and unblocking this outlet, and a second damper 44 arranged in outlet 32 also for selectively blocking and unblocking its associated outlet. A third damper 46 is arranged in opening 34. While it will be understood that these dampers can be manually actuated or automatically controlled by known thermostatically controlled equipment, a description of typical operation of assembly 40 will be set forth below.

Furnace 14, with it being understood that furnace 16 is generally similar in construction, includes a heat exchanger 48 disposed within a cavity 50 formed by housing 38 of chamber 12. An oil burner 52, and the like, is arranged adjacent heat exchanger 48 for applying heat to exchanger 48, with it being pointed out that furnace 16 will include a wood or coal burning firebox, and the like, in place of the fluid combusting burner construction as exemplified by burner 52 of furnace 14.

Heat exchanger 48 includes a shell 54 arranged extending through cavity 50 of chamber 12 and partially forming a flow path 56 for fluid to be heated in conjunction with a tube 58 disposed within and extending through shell 54. Tube 58 is arranged forming a passageway through cavity 50 of chamber 12 for combustion gases from burner 52. A blower 60 is mounted on top wall 36 of housing 38 and is arranged in communication with shell 54 for forcing a fluid to be heated into shell 54 and over tube 58 along the annular path 56 in the opposite direction of travel through tube 58 of the combustion gases generated by burner 52.

Shell 54 includes a portion 62 which surrounds a stack 64 forming a vertical extension of tube 58 from the ends thereof spaced longitudinally from burner 52, and a portion 66 provided with at least one, and preferably the illustrated plurality, of apertures 68 arranged placing flow path 56 in communication with cavity 50 of chamber 12. Portion 62 also forms a passageway between shell 54 and blower 60, such that the fluid flow generated by blower 60 will travel downwardly along and around stack 64 as shown by the flow arrows in FIG. 2 in order to increase the efficiency of the heat exchange within the exchanger 48. Furnace 16 being similar in construction to furnace 14 is provided with a stack 64', and can be placed in communication with the blower 60 as by the use of a manifold, and the like, extending from blower 60 to the associated shell of the respective furnace.

Figure 3:
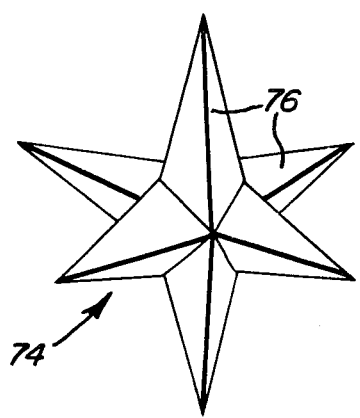
FIG. 3 is a perspective view showing a star-shaped discrete article for use with a layered heat storage medium arrangement according to the present invention.

Disposed within cavity 50 of chamber 12 is a heat absorbing medium 70 comprising a plurality of layers of rock 72 separated by a plurality of layers of discrete articles 74 interspersed with the layers of rock 72. Each of the articles 74 is constructed from, for example, iron and shaped in the form of a three-dimensional star having a plurality of pyramid-shaped points 76, as can be readily seen from FIG. 3 of the drawings. The rocks 72 can be, for example, approximately 1½ inches in largest dimension, with the article 74 having, for example, six points and being approximately three inches in length over-all. By this arrangement, articles 74 give the air or other suitable fluid being heated a chance to travel through the heated rock 72 and article 74 filling the cavity 50 of chamber 12 and give heat to or gain heat from the medium 70 during such travel.

Operation of the Device Shown in FIGS. 1 and 2

When the sun (not shown) is out and the medium 70 in chamber 12 is at a peak temperature and a thermostat (not shown) disposed in a space to be heated calls for more heat, damper 42 opens and damper 44 remains closed in order to pass the heat collected from the sun directly into plenum 18 and out through the distribution pipes 20. If, on the other hand, a thermostat (not shown) monitoring temperature within medium 70 indicates that more heat is required within chamber 12, damper 44 will open and damper 42 close in order to pass the solar heat into medium 70 and heat the layers of rock 72 and cost iron articles 74 before dispersing the hot fluid into the space to be heated by passage through opening 34 and into plenum 18 for distribution through pipes 20. Under these conditions, damper 46 will be in the open position shown by broken lines in FIG. 2.

If the demand for heat is satisfied, damper 42 closes, and if the demend for heat within medium 70 is also satisfied, damper 44 closes. If, under the circumstances, the sun remains out for a long period of time, then a conventional booster (not shown) can kick in and override the limit control of the afore-mentioned thermostats and build up more storage temperature within medium 70, taking full advantage of the solar energy. If, however, there is no sun, both dampers 42 and 44 move to the closed position seen in FIG. 2, and furnace 14 goes on in order to supply heat to medium 70. Furnace 16 is a manually controlled backup for furnace 14. As can be appreciated, the usual heat losses through the walls of a furnace is completely recovered by a device 10, inasmuch as such heat loss is desirable in order to transfer heat into the storage medium 70. Thus, this heat generated by a furnace 14, 16 can be either stored within cavity 50 of chamber 12, or damper 46 can be opened and heat passed through opening 34 into plenum 18 for distribution to space to be heated as demand may require. The provision of a pair of furnaces 14 and 16, although only one of such furnaces is necessary to carry out the invention, permits any suitable fuel available to be employed with device 10, and thus provides complete flexibility with respect to fuel employed in order to guard against shortages of or unreasonable prices for the various combustible fuels conventionally employed for the heating of residences and other structures.

Figure 4:
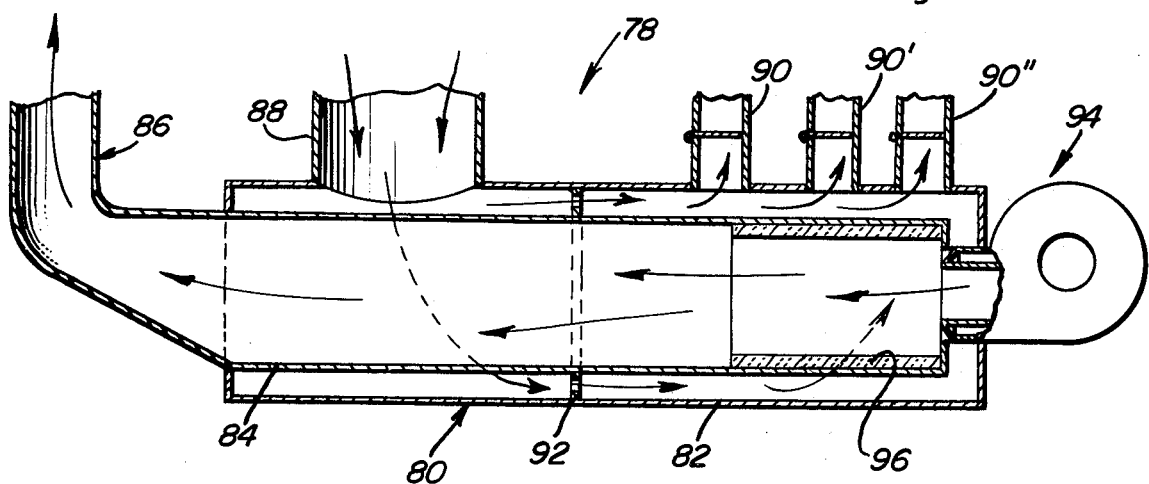
FIG. 4 is a fragmentary, schematic, vertical longitudinal sectional view showing a counter-flow furnace according to the present invention.
Figure 5:
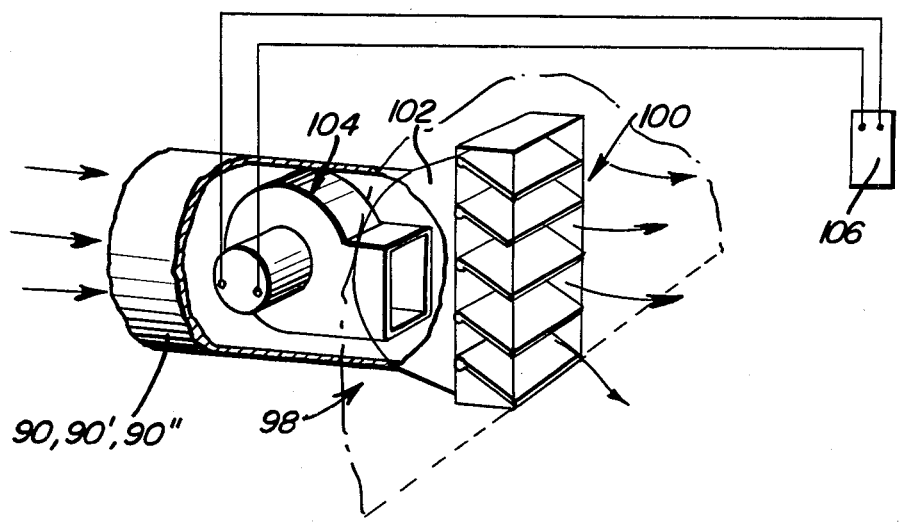
FIG. 5 is a fragmentary, schematic, perspective view, partly broken away in section, showing a fluid suction register in accordance with the present invention.

Description of the Form of the Invention Shown in FIGS. 4 and 5 of the Drawings Referring now more particularly to FIGS. 4 and 5 of the drawings, a furnace 78 according to the invention is constructed in a manner similar to furnaces 14 and 16, and includes a counterflow heat exchanger 80 comprising a shell 82 arranged around a tube 84 terminating in a vertically disposed stack 86. Shell 82 includes an inlet pipe 88 and a plurality of outlet ducts 90, 90' and 90", arranged for directing heated fluid medium to different spaces, or different parts of a space, to be heated. An apertured ring 92 is disposed between shell 82 and tube 84 substantially midway of the longitudinal extent thereof for spacing shell 82 from tube 84 while simultaneously separating shell 82 into an annular flow path and an annular plenum. A burner 94 of any conventional construction is disposed at the end of tube 84 adjacent the outlet ducts 90, 90' and 90" so as to generate combustion gases which will travel along the extent of tube 84 and out stack 86. This burner 94 has associated therewith a sleeve 96 constructed from a refractory material and disposed lining the inside of tube 84 adjacent the burner 94 in order to protect tube 84 from damage and to assure a counter-flow heat exchange between the fluid medium to be heated which enters pipe 88 and the combustion gases produced by burner 94.

Fluid suction registers 98 are connected to the outlet ducts 90, 90' and 90" at the discharge ends thereof, one register 98 for each of the ducts 90, 90' and 90" for drawing the heated fluid medium through heat exchanger 80 and discharging such medium into associated spaces to be heated. Each of these registers 98 includes an adjustable vent 100 mounted on the discharge end of an associated outlet duct 90, 90' and 90" as by the illustrated transition sleeve 102. A blower 104 of conventional construction is disposed within the end portion of the associated duct 90, 90' and 90" so as to create a suction within the duct and draw air through the duct and out the associated vent 100 into the space to be heated. A conventional thermostat 106 can be connected to blower 104 in a known manner for controlling operation of same and thus causing the heated fluid to be drawn through a particular register 98 only as the space being heated demands heat.

SUMMARY

As can be readily understood from the above description and from the drawings, an energy storage and distributing device according to the present invention permits heating of a residence or like structure in a highly efficient and flexible manner not dependent upon any particular energy source for operation. Further, the construction of counter-flow furnaces as used in an energy storage and distributing device according to the invention permits for highly efficient use of heat energy generated by combustion of convention fuels.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An energy storage and distributing device, comprising, in combination:
   heat storage chamber means for retaining heat;
   furnace means disposed within the chamber means;
   plenum means mounted on the chamber means for directing a warm fluid to a space to be heated;
   fluid distribution means associated with the plenum means and chamber means for alternately directing a fluid current directly into the plenum means and directly into the chamber means, and supplying the plenum means selectively with warm fluid from one of the chamber means and from a source disposed outside the chamber means, including, in combination: a duct having a single inlet and a pair of outlets, the inlet being connected to a source of fluid current, with one of the outlets being in communication with the plenum means and the other of the outlets in communication with the chamber means; an opening provided between the chamber means and plenum means for placing the chamber means and plenum means in communication with one another for transfer of heat from the chamber means to the plenum means; and damper means mounted in the outlets of the duct and in the opening provided between the chamber means and plenum means for selectively directing the fluid current between the chamber means and plenum means; heat exchange means disposed within the chamber means comprising; a shell extending through the chamber means and partially forming a flow path for a fluid to be heated; a tube disposed within and extending through the shell and forming the flow path in cooperation with the shell, the tube being arranged forming a passageway through the chamber means for combustion gases from the burner; a blower mounted on the chamber means and arranged in communication with the shell for forcing a fluid into the shell and over the tube along the fluid flow path; and a burner arranged adjacent the heat exchanger means for applying heat to the exchanger means.

2. A structure as defined in claim 1, wherein the damper means comprises, in combination:
(a) a first damper arranged in the one of the outlets for selectively blocking and unblocking the associated one of the outlets;
(b) a second damper arranged in the other of the outlets for selectively blocking and unblocking the other of the outlets; and
(c) a third damper arranged in the opening provided between the chamber means and plenum means for selectively blocking and unblocking the opening, each of the first damper, second damper and third damper being arrangeable in either a blocking or unblocking position independently of the others.

3. A structure as defined in claim 1, wherein the shell is provided with at least one perforation arranged placing the flow path formed by the shell and tube in communication with the chamber means.

4. A structure as defined in claim 1, wherein the chamber means includes, in combination:
a housing forming a cavity, the heat exchanger means being disposed within the cavity; and
heat absorbing means arranged within the cavity and covering the heat exchanger means for storing a heated fluid medium fed into the cavity from the fluid distribution means and the heat exchanger means.

5. A structure as defined in claim 4, wherein the heat absorbing means comprises a plurality of discrete articles, each of the discrete articles being constructed in the form of a three-dimensional star having a plurality of points.

* * * * *